United States Patent
Ta et al.

(10) Patent No.: US 7,415,560 B2
(45) Date of Patent: Aug. 19, 2008

(54) METHOD OF AUTOMATICALLY MONITORING COMPUTER SYSTEM DEBUGGING ROUTINE

(75) Inventors: Chen Chun Ta, Taipei (TW); Jing Rung Wang, Taipei (TW); Janq Lih Hsieh, Taipei (TW)

(73) Assignee: Via Technologies, Inc., Taipei (TW)

( * ) Notice: Subject to any disclaimer, the term of this patent is extended or adjusted under 35 U.S.C. 154(b) by 50 days.

(21) Appl. No.: 11/488,831

(22) Filed: Jul. 19, 2006

(65) Prior Publication Data

US 2007/0101034 A1   May 3, 2007

(30) Foreign Application Priority Data

Oct. 27, 2005   (TW) ............... 94137628 A

(51) Int. Cl.
*G06F 13/24* (2006.01)
(52) U.S. Cl. ...................... 710/266; 718/108
(58) Field of Classification Search ................ 710/260, 710/266, 48, 305, 306, 312, 4, 8; 718/107–108; 714/25
See application file for complete search history.

(56) References Cited

U.S. PATENT DOCUMENTS 4,672,601 A * 6/1987 Ablay ............... 370/277
5,408,466 A * 4/1995 Ablay ............... 370/278
5,544,159 A * 8/1996 Ablay ............... 370/281
5,694,603 A * 12/1997 Reiffin ............... 718/107
5,694,604 A * 12/1997 Reiffin ............... 718/107
2007/0101034 A1* 5/2007 Ta et al. ............... 710/260

OTHER PUBLICATIONS

"Adapting Ada toolsets to embedded multiprocessing applications" by L.M.Gearhart (abstract only) Publication Date: May 22-26, 1989.*

* cited by examiner

*Primary Examiner*—Clifford H Knoll
(74) *Attorney, Agent, or Firm*—Rosenberg, Klein & Lee

(57) ABSTRACT

A monitor method of computer system is provided, applying within an interrupt service routine. According to the application of interrupt service, when the interrupt controller sends an interrupt signal to the CPU, the CPU executes a corresponding interrupt service routine based on the interrupt signal, in the meantime, the daemon program generates an entrant code. Before the interrupt service routine stops, the daemon program generates an exit code and saves both the entrant code and the exit code in a storage device. It is benefit for solving the problems occurred in the debugging process according to the entrant code and the exit code of the storage device, and speeding up the process of testing and researching steps.

20 Claims, 3 Drawing Sheets

METHOD OF AUTOMATICALLY MONITORING COMPUTER SYSTEM DEBUGGING ROUTINE

BACKGROUND OF THE INVENTION

1. Field of the Invention

The present invention relates to a method for monitoring a computer system, and more particularly to a method of applying an interrupt service routine by a daemon monitor program for detecting and analyzing detailed debugging information.

2. Description of Related Art

In current computer systems, the system designer typically encounters problems in designing and developing both hardware and software. Designers often use debugging engines such as logic analyzers (LA) or in-circuit emulators (ICE) to analyze or debug command processes of the hardware and other parts of a computer system.

However, implementation of hardware tools such as LA or ICE is very complicated. For example, the difficulty of using the logic analyzing apparatus and ICE is determined by a trigger condition. In other words, the debugger must determine a proper condition to trigger the debugging engines based on the particular problem to be solved. Under general conditions, users usually obtain the result of the problem but are not able to set a proper trigger condition. In the meantime, it is necessary to constantly monitor the computer system in order to determine the cause of the particular error. The need for human intervention can obviously lead to errors associated with incorrect observations of the debugging process.

Although there are presently rapid improvements occurring in chip and CPU technology, which will aid in replacing LA and ICE, the cost of using these tools is still expensive, which in turn can result in expensive testing and debugging.

Therefore, it is desirable to provide an improved automatic method of monitoring debugging processes in computer systems.

SUMMARY OF THE INVENTION

It is the primary object of the present invention to provide a new monitor method for computer systems in order to solve the problems associated with reading detailed information in the debugging process.

In order to achieve the foregoing objects, the present invention provides a monitor method for computer systems, comprising the steps of: receiving a request signal; transmitting an interrupt signal; executing an interrupt service routine and generating a entrant code; saving said entrant code; terminating said interrupt service routine and generating a exit code; and saving said exit code.

Moreover, the present invention provides an automatic monitoring method for a computer system, wherein the computer system comprises a CPU, a main controller, a data storage device, and a plurality of peripheral devices; said main controller comprising an interrupt controller. The monitor method comprises the steps of: providing at least one interrupt service routine, wherein each interrupt service routine comprises a daemon monitoring program; generating an interrupt signal by the interrupt controller after receiving an interrupt request signal and then transmitting the interrupt signal to the CPU; executing a corresponding interrupt service routine according to the interrupt signal when the CPU receives the interrupt signal; and generating an entrant code by the daemon monitoring program when the interrupt service routine starts, and generating an exit code before the interrupt service routine stops; saving the entrant code and exit code into the data storage device; monitoring the operating condition of computer system according to the entrant code and exit code of the data storage device.

Other objects, advantages, and novel features of the invention will become more apparent from the following detailed description when taken in conjunction with the accompanying drawings.

DETAILED DESCRIPTION OF THE PREFERRED EMBODIMENT

The prior art employed by the present invention will be summarily mentioned to help the presentation of present invention. Diagrams accompanying the descriptions below are not drawn by actual proportions, but mean to illustrate the structural features of the invention.

Figure 1:
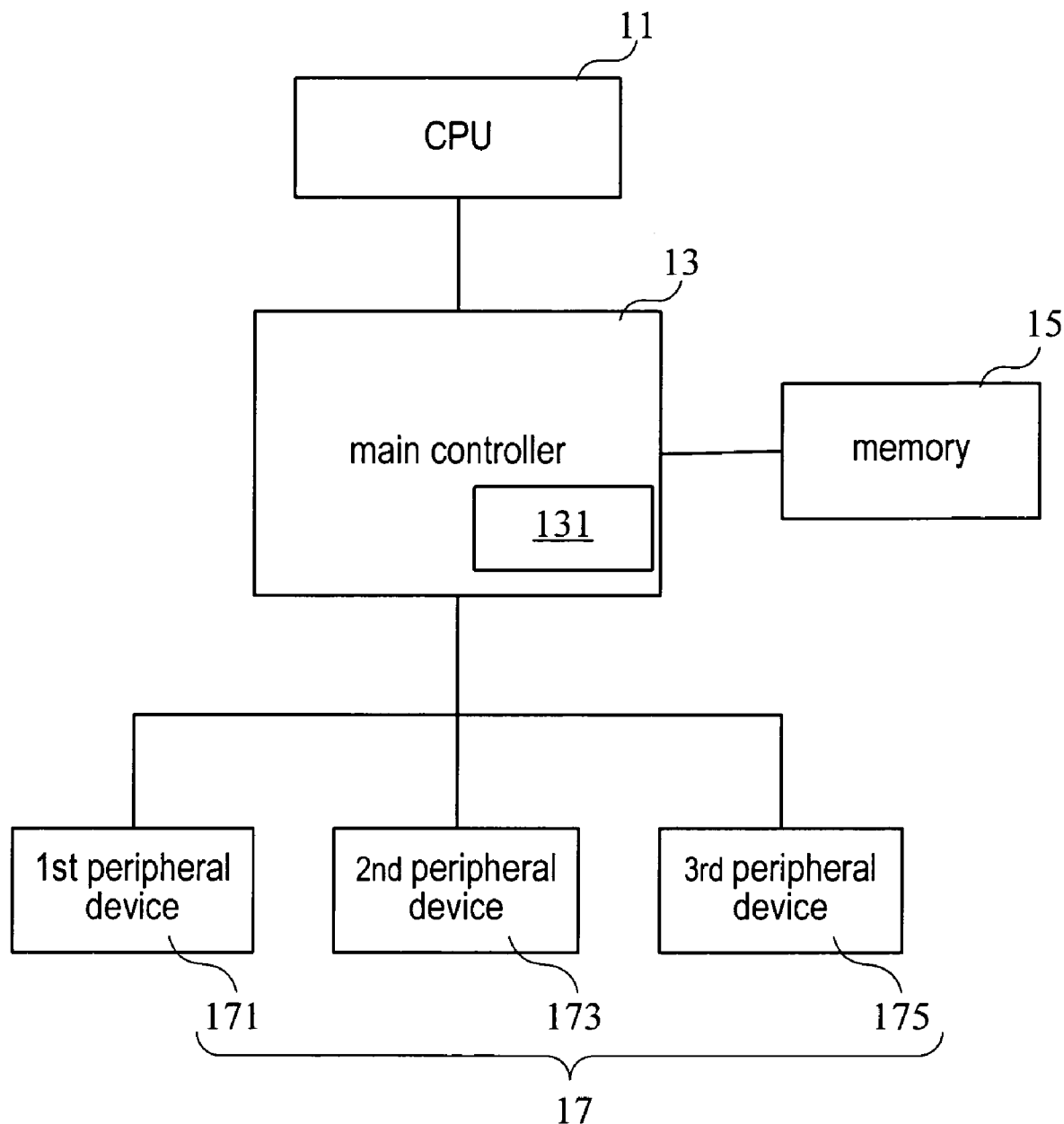
FIG. 1 is a block diagram of a simple computer system.

Referring to FIG. 1, there is shown a connection diagram of primary elements of a computer system. As shown in the figure, the primary elements of a computer system comprises at least a central processing unit (CPU) 11, a main controller 13, a memory 15 and a plurality of peripheral devices 17.

The main controller 13 comprises an interrupt controller 131, and the main controller 13 is electrically connected respectively to the central processing unit 11, the memory 15 and the peripheral devices 17. It operates in conjunction with a daemon program in order to achieve the purpose of debugging for the peripheral devices 17, software and whole computer system.

In general, a main controller 13 is used for the connection and communication between the peripheral devices 17 and the CPU 11 in a computer system. The main controller 13 can be a south bridge, a north bridge, or an integrated chip with a south bridge and a north bridge together.

When the first peripheral device 171 needs the CPU 11 for processing data, the first peripheral device 171 generates an interrupt request (IRQ) signal and transmits the IRQ signal to the interrupt controller 131 of the main controller 13. The interrupt controller 131 generates a corresponding interrupt signal after receiving the IRQ signal and transmits the interrupt signal to the CPU 11.

After receiving the interrupt signal, the CPU 11 suspends all other processes and saves the related data. Then the CPU 11 will search one of the interrupt service routines in the interrupt vector table according to the interrupt signal and executes the interrupt service routine. In this way, the command from the first peripheral device 171 is executed by the CPU 11. The commands from the second peripheral device 173, the third peripheral device 175 or other software and firmware can also be executed by the CPU 11 in the same manner.

Figure 2:
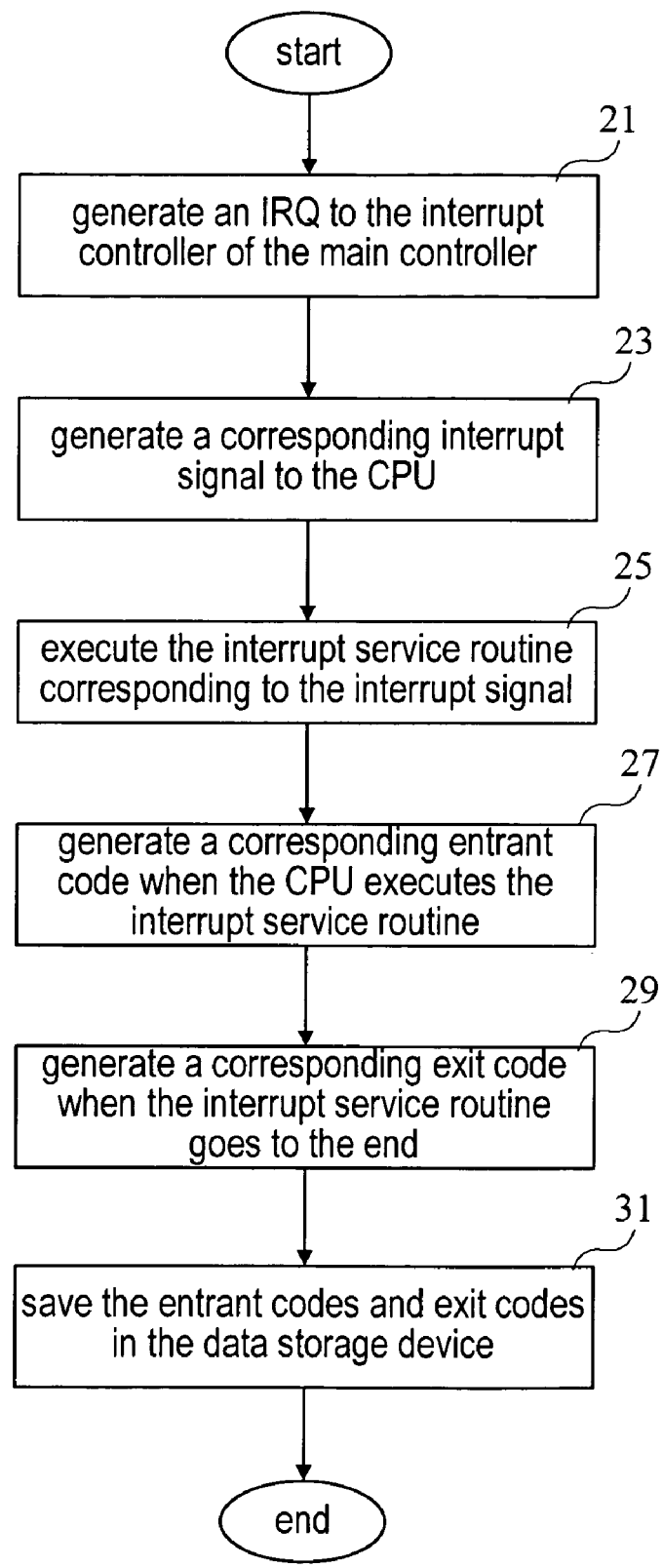
FIG. 2 is a flow chart of a preferred embodiment of the present invention.

FIG. 2 shows a flow chart illustrating the steps of the preferred embodiment of the present invention. In the present invention, a daemon monitor program is provided within each interrupt service routine. Once an interrupt service routine is executed, the daemon monitor program in the interrupt service routine initially generates an entrant code; saves the entrant code into a data storage device; generates an exit code before the interrupt service routine stops; and saves the exit code into the data storage device. Therefore, users can determine if execution of interrupt service routines produced errors, by tracing and examining the detailed information of the entrant code and exit code saved in the data storage device, and thereby achieve the purpose of system testing and debugging.

The method of the present invention comprises the following steps. First, provide interrupt service routines comprising the daemon monitor program. When a peripheral device 17, software or firmware of the computer system needs the CPU 11 for processing data or command execution, it will generate an IRQ signal and transmit the IRQ signal to the interrupt controller 131 of the main controller 13, as shown in step 21.

When the interrupt controller 131 of the main controller 13 receives an IRQ signal it will generate a corresponding interrupt signal and transmit the interrupt signal to the CPU 11, as shown in step 23.

The CPU 11 suspends the processing commands or processes after receiving the interrupt signal from the interrupt controller 131, and saves the related data. Then, the CPU 11 starts searching the interrupt vector table and to finds an interrupt service routine corresponding to the interrupt signal and then executes the interrupt service routine, as shown in step 25. For example, if the IRQ signal is generated by the first peripheral device 171, the CPU 11 will find and execute the corresponding interrupt service routine from the interrupt vector table. Thus, it is able to achieve the purpose of using the CPU 11 to execute the command or request from the first peripheral device 171.

When the CPU 11 executes the interrupt service routine, the daemon monitor program will generate a corresponding entrant code and saves the entrant code into the data storage device, for example, a hard disk, a flash disk, an optical storage media or a memory 15, as shown in step 27.

When the interrupt service routine completes the daemon monitor program will also similarly generate and save a corresponding exit code, in the data storage device, as shown in step 29. After processing a series of testing commands or calculations, a plurality of entrant codes and exit codes may be saved in the data storage device, as shown in step 31.

Each entrant code and exit code comprises identification codes corresponding to the interrupt service routine which generated the entrant code or exit code. Moreover, the entrant and exit codes also comprise the execution start and stop times of the interrupt service routine, respectively.

According to the monitor method mentioned above, it is possible to monitor and save execution start/stop times and the data of the interrupt service routine. The users can further beneficially understand the process of debugging and testing. For example, if an interrupt service routine is executed but not stopped, there would be only a corresponding entrant code but no exit code in the data storage device. Therefore, users could clearly understand that problems occurred in the execution process of the interrupt service routine and find out the corresponding interrupt signal. In addition, users could determine which peripheral, software, or firmware device generated the corresponding interrupt request signal and produced an error.

Users can also discern other abnormally occurring conditions by analyzing different sets of entrant and exit codes generated by the daemon monitor program of the interrupt service routine corresponding to the same peripheral device, software or firmware. For example, when the CPU 11 executes the interrupt service routine corresponding to the interrupt request signal from the second peripheral device 173 for the first time, it generates a first entrant code and a first exit code. When the CPU 11 executes the same interrupt service routine for the second time, it generates a second entrant code and a second exit code. By analyzing differences between first and second entrant/exit codes, users can gain further insight into the nature of the errors and conditions associated with execution of the interrupt service routine corresponding to the interrupt request signal from the second peripheral device 173.

Figure 3:
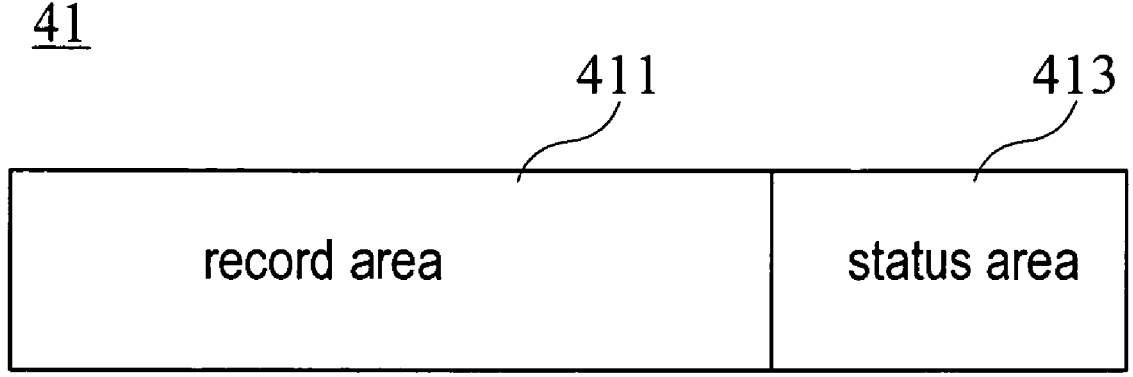
FIG. 3 is a block diagram of saving status of the entrant code and exit code of a preferred embodiment of the present invention.
Figure 3:
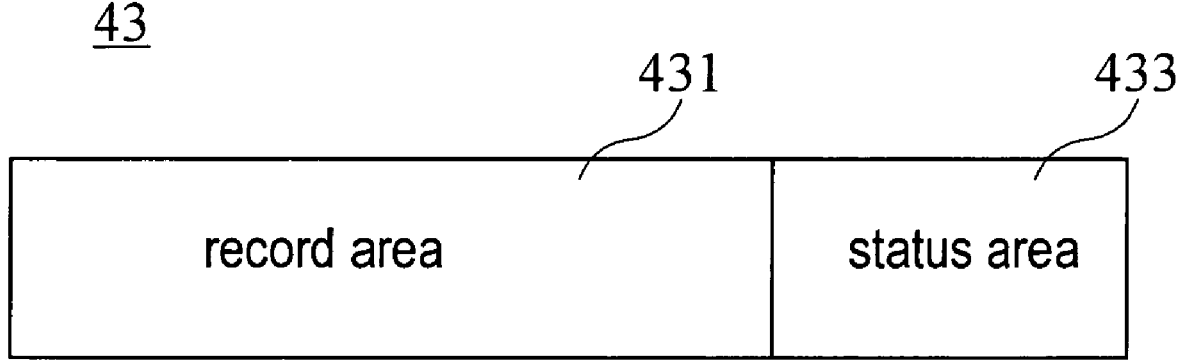

FIG. 3 shows a block diagram of the saving status of the entrant code and the exit code of a preferred embodiment of the present invention. The entrant code 41 comprises a record area 411 and a status area 413; the exit code 43 also comprises a record area 431 and a status area 433. The record areas 411, 431 are used for saving detailed information of the interrupt service routine. The detailed information comprises, for example, the peripheral device corresponding to the interrupt service routine or the identification code of the peripheral device and the execution start and stop time of the interrupt service routine.

Status areas 413, 433 are used to label the status of entrant and exit codes. For example, if the status area 413 records a signal data defined as "0", it means that the recorded information is an entrant code 41. On the contrary, if the status area records a signal data "1", it means that the recorded information is an exit code 43.

According to the description above, the present invention relates to a monitor method for a computer system, and more particularly to a monitor method applying an interrupt service routine by a daemon monitor program for detecting, and analyzing detailed debugging information.

Although the present invention has been explained in relation to its preferred embodiment, it is to be understood that many other possible modifications and variations can be made without departing from the spirit and scope of the invention as hereinafter claimed.

What is claimed is:

1. An automatic monitor method for a computer system, comprising the steps of:
   receiving an interrupt request signal from a peripheral device, software or firmware of the computer system;
   generating an interrupt signal;
   transmitting said interrupt signal to a CPU;
   executing an interrupt service routine within said CPU and generating an entrant code;
   saving said entrant code;
   terminating said interrupt service routine and generating an exit code; and
   saving said exit code.

2. The automatic monitor method of claim 1, wherein said interrupt request signal is received by an interrupt controller.

3. The automatic monitor method of claim 2, wherein said interrupt controller is disposed in a main controller.

4. The automatic monitor method of claim 3, wherein said main controller is selected from one of a south bridge, a north bridge and an integrated chip with a south bridge and a north bridge together.

5. The automatic monitor method of claim 1, wherein said interrupt signal is generated by an interrupt controller, and received by said CPU.

6. The automatic monitor method of claim 5, wherein said interrupt controller is disposed in a main controller.

7. The automatic monitor method of claim 6, wherein said main controller is selected from one of a south bridge, a north bridge and an integrated chip with a south bridge and a north bridge together.

8. The automatic monitor method of claim 1, wherein said interrupt service routine corresponds to said interrupt request signal received from a peripheral device, software, or firmware of the computer system; said interrupt service routine comprising a daemon monitoring program.

9. The automatic monitor method of claim 8, wherein said entrant code comprises an identification code of said peripheral device, software or firmware of the computer system; said entrant code generated by the daemon monitoring program.

10. The automatic monitor method of claim 8, wherein said exit code comprises an identification code of said peripheral device, software or firmware of the computer system; said exit code generated by the daemon monitoring program.

11. The automatic monitor method of claim 1, wherein said entrant code and said exit code are saved in a storage device.

12. The automatic monitor method of claim 11, wherein said storage device is selected from one of a hard disk, a memory card, an optical medium storage device, and a flash disk.

13. The automatic monitor method of claim 1, wherein said entrant code and said exit code are saved temporarily in a memory.

14. The automatic monitor method of claim 1, wherein said entrant code comprises an identification code of said interrupt service routine.

15. The automatic monitor method of claim 1, wherein said entrant code comprises the start time of said interrupt service routine.

16. The automatic monitor method of claim 1, wherein said exit code comprises an identification code of said interrupt service routine.

17. The automatic monitor method of claim 1, wherein said exit code comprises the stop time of said interrupt service routine.

18. The automatic monitor method of claim 1, wherein said entrant code comprises a record area and a status area.

19. The automatic monitor method of claim 1, wherein said exit code comprises a record area and a status area.

20. An automatic monitor method for a computer system, wherein said computer system comprises a CPU, a main controller, a data storage device, and a plurality of peripheral devices, said main controller comprising an interrupt controller, said automatic monitor method comprises the steps of:
providing at least one interrupt service routine, wherein each interrupt service routine comprises a daemon monitoring program;
generating an interrupt signal by said interrupt controller after receiving an interrupt request signal from one of said peripheral devices, software or firmware of the computer system and then transmitting said interrupt signal to said CPU;
executing said corresponding interrupt service routine according to said interrupt signal when said CPU receives said interrupt signal, wherein saving an entrant code generated by said daemon monitoring program in said data storage device when said interrupt service routine starts and saving an exit code generated by said daemon monitor program in said data storage device when said interrupt service routine stops; and
monitoring the operating condition of the computer system according to said entrant code and said exit code.

* * * * *